M. A. WHITING.
SYSTEM OF ELECTRICAL DISTRIBUTION.
APPLICATION FILED JUNE 6, 1917.
1,300,074.
Patented Apr. 8, 1919.
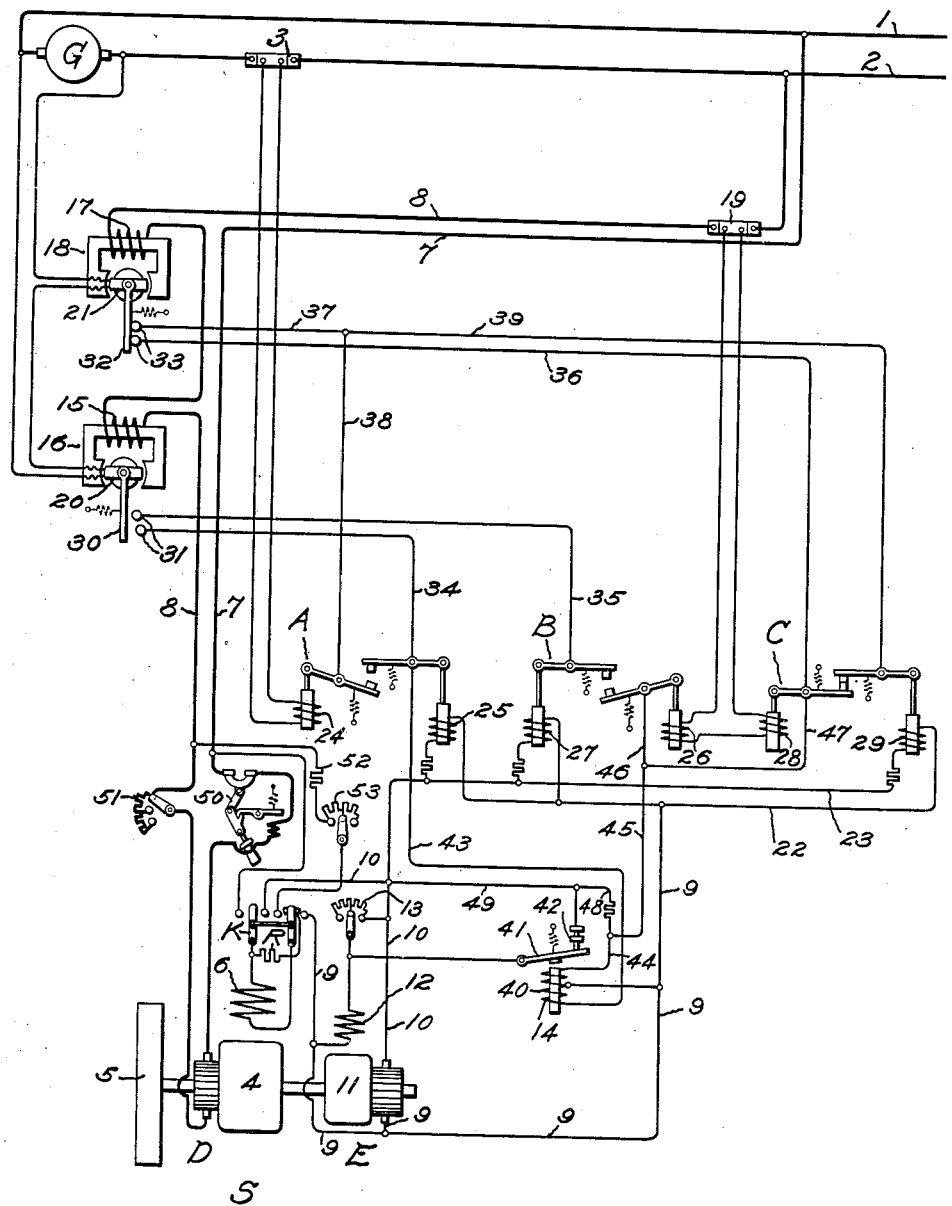
Inventor
Max A. Whiting
by Albert G. Davis
His Attorney

UNITED STATES PATENT OFFICE.

MAX A. WHITING, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

1,300,074.

Specification of Letters Patent.   Patented Apr. 8, 1919.

Application filed June 6, 1917.   Serial No. 173,121.

*To all whom it may concern:*

Be it known that I, MAX A. WHITING, a citizen of the United States, residing at Schenectady, in the county of Schenectady, State of New York, have invented certain new and useful Improvements in Systems of Electrical Distribution, of which the following is a specification.

My invention relates to systems of electrical distribution and in particular to systems wherein a fly-wheel equalizer set is employed to equalize the load upon a main source of electrical energy, which supplies power to a distribution circuit, when the load upon said circuit is subject to rapid fluctuation, as is the case when motors for rolling mills, cranes, etc. are operated therefrom.

It has heretofore been a common practice to employ automatic means, responsive to the load upon the main source of electrical energy, to regulate the operation of the fly-wheel equalizer set and to cause it to assume the load in excess of a predetermined load. Under conditions, which may exist at certain periods in the operation of the system, if the regulation of the operation of the equalizer set depends solely upon the load upon the main source, the current traversing the equalizer set may exceed the maximum current capacity thereof and, indeed, under some conditions the regulation of the equalizer set in accordance with the load upon the main source may even contribute to the overloading of the fly-wheel equalizer set.

For example, assume that the ordinary load conditions have prompted the selection of a fly-wheel equalier set having a maximum current capacity of 3000 amperes and assume that it is desired to limit the current, supplied by the main source of electrical energy to the distribution circuit, to 4000 amperes. If the load upon the distribution circuit be less than 4000 amperes the equalier set will be driven by energy supplied thereto from the main source of electrical energy. If the load upon the distribution circuit exceed 4000 amperes, the means, responsive to the load upon the main source, will cause the kinetic energy of the equalier set to be partially transformed into electrical energy which will be returned to the distribution circuit. This transformation of energy will continue so long as the load upon the main source of electrical energy exceeds 4000 amperes and until the speed of the equalizer set has dropped to a value corresponding to the voltage of the distribution circuit and full field on the equalizer set. If when the fly-wheel equalizer set has this minimum speed, a sufficient portion of the load upon the distribution circuit be disconnected therefrom, the dynamo electric machine of the equalizer set will operate as a motor and may take current in excess of the 3000 amperes for which it is designed. If the equalizer set be running above its minimum speed and a load in excess of 7000 amperes occur on the distribution circuit, the dynamo electric machine of the equalizer set, operating as a generator, will supply the load current in excess of 3000 amperes and consequently be excessively overloaded. It is thus evident that the dynamo-electric machine of the fly-wheel equalizer set may, under certain conditions, be overloaded either when it is operating as a motor or when it is operating as a generator.

The object of my invention is to protect the fly-wheel equalizer set, in a system of the kind referred to, against extreme overloads and to regulate the operation of the set within the limits determined by its current carrying capacity in accordance with the load upon the main source of electrical energy.

In accordance with my invention, I provide in a distribution system comprising a main source of electrical supply, a distribution circuit connected thereto and adapted to be supplied with current thereby, a fly-wheel equalizer set comprising a dynamo-electric machine having an armature connected across said circuit and adapted to operate either as a generator or as a motor, and an exciter electrically connected to the field winding of said machine, a new arrangement for controlling the voltage of said exciter.

In the accompanying drawing, which is a diagrammatic view of a system embodying one form of my invention, is shown a source of electrical energy, consisting of a generator G, connected to the distribution circuit 1—2 and adapted to supply current thereto through the shunt 3. S represents a fly-wheel equalizer set comprising a dynamo-electric machine D having an armature 4, a fly-wheel 5 and a field winding 6. The fly-wheel 5 is mechanically connected to rotate with the armature 4. The armature 4 of the dynamo-electric machine D is connected across the distribution circuit 1—2 by means of the conductors 7—8.

I have illustrated means comprising a double throw switch for connecting the field winding 6 across the conductors 7—8, during the starting period of the set, and for connecting the field winding 6 to the conductors 9—10, leading from the exciter armature, during the subsequent normal operation of the set. The field winding 6 is provided with a field discharge resistance R, which is connected across the winding 6 when the switch K is moved from the position in which the winding 6 is excited from the conductors 7—8 or from the position in which the winding 6 is excited from the conductors 9—10. The exciter E comprises an armature 11, adapted to rotate with the armature 4 of the dynamo-electric machine D, and a field winding 12, the excitation of which is automatically regulated, by means comprising the adjustable resistance 13 and the relay 14, in a manner hereinafter described.

In the conductor 8 is inserted the current winding 15 of a reverse current relay 16, the current winding 17 of the reverse current relay 18 and the shunt 19. The voltage windings 20 and 21 of the reverse current relays 16 and 18 are shown as connected in series across the circuit 1—2, but may obviously be connected in multiple across the circuit 1—2, or in series or in multiple across any source of direct current voltage. The conductors 9 and 10, leading from the exciter armature, are connected to the conductors 22—23, respectively.

To control the operation of the equalizer set, the regulators A, B and C are employed. These, according to the drawing, are of the vibratory type.

The regulator A comprises relatively movable contacts, one of which is adapted to be operated in response to the energization of the winding 24, which is connected across the shunt 3, and the other of which is adapted to be operated in response to the energization of the winding 25, which is connected across the conductors 22—23.

The regulator B comprises relatively movable contacts, one of which is adapted to be operated in response to the energization of the winding 26 and the other of which is adapted to be operated in response to the energization of the winding 27, which is connected across the conductors 22—23.

The regulator C comprises relatively movable contacts, one of which is adapted to be operated in response to the energization of winding 28, and the other of which is adapted to be operated in response to the energization of winding 29, which is connected across the conductors 22—23. The windings 26 and 28 of the regulators B and C are connected in series across the shunt 19.

The voltage winding 20 of the reverse current relay 16 is mounted to move with respect to the current winding 15 and carries a contact member 30 which coöperates with the stationary contacts 31. Similarly the voltage winding 21 of the reverse current relay 18 is mounted to move with respect to the current winding 17 and carries a contact member 32 which coöperates with the stationary contacts 33. The stationary contacts 31 are electrically connected, by means of the conductors 34 and 35, to the contacts operated by the windings 25 and 27 of the regulators A and B, respectively. One of the stationary contacts 33 is electrically connected, by means of the conductor 36, to the contact operated by the winding 28 of the regulator C. The other stationary contact 32 is electrically connected, by means of the conductor 37 and conductors 38 and 39, to the contact operated by the winding 24 of the regulator A and to the contact operated by the winding 29 of the regulator C.

The relay 14 comprises an electromagnet having a winding 40, a movable contact member 41 and a stationary contact member 42. The conductor 9, leading from one side of the exciter armature 11, is connected to an intermediate point on the winding 40. One terminal of the winding 40 is connected by means of the conductor 43 to the contact of the regulator A which is operated by the winding 25. The other terminal of the winding 39 is connected, by means of the conductors 44, 45, 46 and 47 to the contact of the regulator B which is operated by the winding 26 and the contact of the regulator C which is operated by the winding 28. The last named terminal of the winding 40 is also connected by means of the conductors 48 and 49 and 10 to one side of the exciter armature 11. The field winding 12 is connected in series with the resistance 13 across the conductors 9 and 10. The resistance 13 is short-circuited when the movable contact member 41 and the stationary contact 42 are in engagement.

The reverse current relay 16 is adapted to maintain the contact member 30 in engagement with the stationary contacts 31, when the dynamo-electric machine D is operating as a motor, and may be designed to cause the engagement of contact member 30 and stationary contacts 31 either when the dynamo-electric machine D begins to operate as a motor or only when, during the motor operations thereof the current therein exceeds a predetermined value. The reverse current relay 18 is adapted to maintain the contact member 32 out of engagement with the stationary contacts 33 when the dynamo-electric machine D is operating as a generator and may be designed to cause the disengagement of the contact member 32 and stationary contacts 33 either when the dynamo electric machine D begins to operate as a generator or only when, during the generator operation thereof, the current therein exceeds a predetermined value.

The armature 4 of the dynamo-electric machine D is adapted to be connected to the conductors 7—8 through the combined switch and circuit breaker 50 and the starting resistance 51, while the field winding 6 is adapted, during the starting of the set, to be connected to the conductors 7—8 through the switch K, the resistance 52 and the adjustable resistance 53.

The operation of my invention, as at present understood, is as follows:

First assume the generator G to be in operation and to be supplying current to the distribution circuit 1—2. Also assume the dynamo-electric machine D to have been started by connecting the field winding 6 to the conductors 7—8, closing circuit breaker 50, cutting out resistance 51, adjusting resistance 53 and connecting the field winding 6 to the conductors 9—10, leading from the exciter armature 11. Also assume for purposes of explanation, that the reverse current relay 16 is designed to cause the engagement of the contact member 30 and the stationary contacts 31, when during the motoring operation of the dynamo-electric machine D the current therein exceeds 2500 amperes. Assume also that the reverse current relay 18 is designed to cause the disengagement of the contact member 32 and the stationary contacts 33, when during the generating operation of the dynamo-electric machine D the current therein exceeds 2500 amperes. Assume also that it is desired to have the load on the fly-wheel equalizer set assume the load on the distribution circuit in excess of 4000 amperes and that the regulator A has been adjusted to tend to hold the current traversing the shunt 3 at 4000 amperes. When the current traversing the shunt 3 is less than 4000 amperes, the dynamo-electric machine D of the equalizer set will operate as a motor causing the set to accelerate to a speed corresponding to the voltage on the distribution circuit 1—2 and the minimum field strength of the machine. If the current traversing the shunt 3 tends to exceed 4000 amperes, the regulator A will regulate the strength of the current traversing the field winding 6 so that current will be delivered by the dynamo-electric machine D to the distribution circuit 1—2 in such amounts as to limit the current traversing the shunt 3 to substantially 4000 amperes. When the movable contact 32 of the reverse current relay 18 is in engagement with the stationary contacts 33 and the movable contact 30 of the reverse current relay 16 is out of engagement with the stationary contacts 31, the operation of the relay 14, which controls the insertion and removal of the resistance 13 of the exciter E, is effected solely by the opening and closing of the contacts of the regulator A, which contacts are included in the following circuit, conductor 9, lower portion of the winding 40, conductor 43, contacts of the regulator A, conductor 38, conductor 37, upper stationary contact 33, contact member 32, lower stationary contact 33, conductor 36, conductor 47 and conductor 45. Hence, when the contacts of the regulator A are in engagement, the upper and lower portions of the winding 40 will both be energized, the resultant magnetomotive force of said winding will be zero and the resistance 13 will be short circuited since the contact member 41 and contact 42 will be in engagement.

If, during the generator operation of the dynamo-electric machine D, the current traversing the shunt 19 exceeds 2500 amperes the contact member 32 will be disengaged from the stationary contacts 33 and the contacts of the regulator C will be connected in series with the contacts of the regulator A. As the current traversing the shunt 19 approaches and tends to exceed 3000 amperes the regulator C will modify the effect of the regulator A to such an extent that the current traversing the dynamo-electric machine D will not exceed 3000 amperes. With the contact member 32 of the reverse current relay 18 out of engagement with the stationary contacts 33 the circuit, in which the contacts of regulator A and the contacts of regulator C are included in series, is as follows—conductor 43, contacts of regulator A, conductor 38, conductor 39, contacts of the regulator C, conductor 47 and conductor 45.

Since the equalizer set cannot deliver current in excess of 3000 amperes, if the load on the distribution circuit exceeds 7000 amperes, the excess over 7000 amperes in addition to the original 4000 amperes will be carried by the generator G.

If now the fly-wheel equalizer set be operating at less than its maximum speed and a sufficient portion of the load be removed from the distribution circuit 1, 2, the dynamo-electric machine D will operate as a motor to accelerate the set and during such operation may tend to draw current in excess of 3000 amperes. To prevent this occurring the regulator B and reverse current relay 16 are employed. If the current drawn by the dynamo-electric machine D, operating as a motor, exceed 2500 amperes the contact 30 of the reverse current relay 16 will engage with the stationary contacts 31. A circuit in shunt to the contacts of regulator A will then be made through the contacts of the regulator B. This shunt circuit includes the conductor 46, the contacts of the regulator B, conductor 35, upper stationary contact 31, contact member 30, lower stationary contact 31 and conductor 34. If now the dynamo-electric machine D tend to draw current in excess of 3000 amperes the regulator B will act to increase the current in the field winding 6 to prevent the current in the armature 4 exceeding this value.

Although it has been assumed in the preceding explanation of the operation of my invention, that the contact member 32 of reverse current relay 18 is disengaged from stationary contacts 33 only when, during the generator operation of the dynamo-electric machine D, the current therein exceeds 2500 amperes, my invention will operate satisfactorily if said contact members and stationary contacts are disengaged whenever the dynamo-electric machine D operates as a generator, inasmuch as in the latter event the operation of the regulator A is unaffected by the regulator C, the contacts of which are in series with those of regulator A, until the current in the machinery D approaches 3000 amperes. Furthermore, my invention operates satisfactorily if the reverse current relay 16 is designed so that the contact member 30 engages stationary contacts 31 whenever the dynamo-electric machine D operates as a motor since the regulator B does not modify the regulating effect of regulator A until the current traversing the dynamo-electric machine D approaches 3000 amperes.

It is thus evident that the operation of the equalizer set S is primarily under the control of the regulator A and that the regulator C becomes effective to modify the operation of said set only in case the current traversing the dynamo-electric machine D, operating as a generator, tends to exceed 3000 amperes and that the regulator B becomes effective to modify the operation of the set only in case the current drawn by the dynamo-electric machine D, operating as a motor, tends to exceed 3000 amperes.

Since the operation of vibratory regulators, of the kind herein shown, is well known no extended explanation of their operation seems necessary.

I conceive that various modifications of my invention may be made and I accordingly do not desire to be limited to the exact arrangement, herein described and shown, but seek to cover in the appended claim all such modifications and arrangements as fall within the spirit and scope of my invention.

What I claim as new and desire to secure by Letters Patent of the United States, is:

In combination, a source of electrical energy, a distribution circuit connected thereto, a fly-wheel equalizer set comprising direct connected fly-wheel and direct current dynamo-electric machine, the armature of said machine being connected to said circuit, an exciter electrically connected to the field winding of said machine, automatic means for controlling the voltage of said exciter comprising a regulator, having relatively movable contacts and responsive to the current supplied to said distribution circuit by said source, a second regulator, having relatively movable contacts and responsive to the current traversing said dynamo-electric machine, a third regulator having relatively movable contacts and responsive to the current traversing said dynamo-electric machine, means responsive to the direction and value of the current traversing said dynamo-electric machine for connecting the contacts of the second regulator in series with the contacts of the first regulator, and means responsive to the direction and value of the current traversing said dynamo-electric machine for connecting the contacts of the third regulator, in shunt to the contacts of the first regulator.

In witness whereof, I have hereunto set my hand this fifth day of June, 1917.

MAX A. WHITING.